(12) United States Patent
Akgul et al.

(10) Patent No.: US 6,983,065 B1
(45) Date of Patent: Jan. 3, 2006

(54) METHOD FOR EXTRACTING FEATURES FROM AN IMAGE USING ORIENTED FILTERS

(75) Inventors: Yusuf Akgul, Northboro, MA (US);
Ivan Bachelder, Newton, MA (US);
Prabhav Morje, Natick, MA (US);
Juha Koljonen, Needham, MA (US);
Jason Davis, Bellingham, MA (US)

(73) Assignee: Cognex Technology and Investment Corporation, Mt. View, CA (US)

(*) Notice: Subject to any disclaimer, the term of this patent is extended or adjusted under 35 U.S.C. 154(b) by 508 days.

(21) Appl. No.: 10/034,066

(22) Filed: Dec. 28, 2001

(51) Int. Cl.
*G06K 9/00* (2006.01)

(52) U.S. Cl. ............... 382/141; 356/73.1; 356/430; 356/901; 348/88; 348/125; 700/95; 700/143

(58) Field of Classification Search ............ 382/100, 382/141–149; 348/86, 88, 125; 700/95, 700/142, 143; 356/73.1, 901, 429, 430, 239.2
See application file for complete search history.

(56) References Cited

U.S. PATENT DOCUMENTS

| | | | |
|---|---|---|---|
| 5,179,419 A * | 1/1993 | Palmquist et al. ......... 356/73.1 |
| 5,319,734 A | 6/1994 | Buzzetti |
| 5,535,002 A | 7/1996 | Csipkes et al. |
| 5,543,915 A | 8/1996 | Csipkes et al. |
| 5,596,672 A | 1/1997 | Harman et al. |
| 5,600,439 A | 2/1997 | Csipkes et al. |
| 5,636,020 A | 6/1997 | Csipkes et al. |
| 5,657,131 A | 8/1997 | Csipkes et al. |
| 5,671,049 A | 9/1997 | Csipkes et al. |
| 5,727,327 A | 3/1998 | Wakabayashi et al. |
| 5,729,622 A | 3/1998 | Csipkes et al. |
| 5,729,966 A | 3/1998 | Grulick |
| 5,768,401 A | 6/1998 | Csipkes et al. |
| 5,768,409 A | 6/1998 | Csipkes et al. |
| 5,809,162 A | 9/1998 | Csipkes et al. |
| 5,857,047 A | 1/1999 | Strand et al. |
| 5,857,049 A | 1/1999 | Beranek et al. |
| 5,862,250 A | 1/1999 | Csipkes et al. |
| 5,870,493 A * | 2/1999 | Vogl et al. ................. 382/195 |
| 5,898,494 A | 4/1999 | Csipkes |
| 5,923,781 A | 7/1999 | Csipkes et al. |
| 5,995,212 A | 11/1999 | Dar et al. |
| 6,014,617 A * | 1/2000 | Kawahara ................... 704/207 |
| 6,069,991 A | 5/2000 | Hibbs-Brenner et al. |

(Continued)

OTHER PUBLICATIONS

Evan Lubofsky, Machine vision takes guesswork out of fiber-polishing inspection, Laser Focus World, Sep. 2001.

(Continued)

*Primary Examiner*—Samir Ahmed
*Assistant Examiner*—Anand Bhatnagar
(74) *Attorney, Agent, or Firm*—Brian Michaelis

(57) ABSTRACT

A method of analyzing machine vision images to identify low contrast features such as scratches or cracks on the polished ends of optical fibers. A bank of oriented filters having incremental angles of orientation are tuned to respond to the frequency characteristics of oriented scratches or cracks having an approximate width. The filters are applied to an image to generate a filter response image for each filter orientation. The set of filter response images are combined to form a single data set indicating a magnitude and angle for each pixel in the original image. Elements of the combined data set having corresponding angles and magnitudes are grouped to form contour components that can be optionally input to higher order processes.

27 Claims, 5 Drawing Sheets

U.S. PATENT DOCUMENTS

| | | |
|---|---|---|
| 6,088,498 A | 7/2000 | Hibbs-Brenner et al. |
| 6,105,396 A | 8/2000 | Glodis et al. |
| 6,137,898 A * | 10/2000 | Broussard et al. .......... 382/132 |
| 6,183,343 B1 | 2/2001 | Buzzetti |
| 6,753,965 B2 * | 6/2004 | Kumar et al. ............... 356/431 |

OTHER PUBLICATIONS

Thomas P. Weldon, William E. Higgins, Dennis F. Dunn, Gabor filter design for multiple texture segmentation, SPIE, OPT. ENG. 35(10), Oct., 1996.

* cited by examiner

FIGURE 2

METHOD FOR EXTRACTING FEATURES FROM AN IMAGE USING ORIENTED FILTERS

FIELD OF THE INVENTION

The invention relates to machine vision systems for inspecting objects, and more particularly to machine vision inspection methods.

BACKGROUND OF THE INVENTION

Various manufacturing processes and other industrial processes require inspection of manufactured and processed parts to identify and/or classify defects.

Automated inspection methods using machine vision techniques are commonly used to perform such inspections. Due to the vast number of possible surface qualities and textures, machine vision applications that are useful for inspecting certain surface types may not be well suited for inspecting certain different surface types. Variations in image feature contrast and reflectivity, for example, can hide critical defects in a machine vision image.

Optical fiber manufacturing operations, for example, use various machine vision inspection techniques for quality assurance or in-process inspections of fiber ends. In fiber-optic cable production, once a fiber has been cleaved, it is polished to ensure its end face is smooth and clean. During the polishing process, the fiber is typically placed against an abrasive disc that polishes the fiber end surface. This process can cause defects, which if undetected can block the proper transmission of light through a fiber.

Most fiber end defects can be categorized into one of four categories: spots, scratches, cladding boundary defects, and cracks. Lightwave signals that are transmitted through optical fibers are degraded when photons that make up the light wave encounter such defects and are deflected. While certain defects are considered acceptable and will not interfere with transmission of lightwave signals, others—especially those near the core of the fiber—may be critical. Fiber end defects must be identified and classified during the manufacturing process so that the fibers can be cleaned, repolished or discarded entirely, depending on the size and location of the defects.

Optical fiber manufacturers have traditionally relied on manual inspection to detect end surface defects that remain after polishing. Such manual inspections are typically performed by inserting a cable into a fiberscope and analyzing a magnified view of the fiber end connector (which includes the fiber end and ferrule). Although manual inspection methods are expensive, the alternative, i.e., machine vision inspection of optical fiber end surfaces, has proven difficult to implement.

Optical fiber end surface inspection has presented many obstacles to the application of automated inspection techniques using machine vision systems. While standard, machine vision software tools are adequate for many industrial machine vision applications, highly specialized operations, like inspecting polished fiber ends, often require specialized vision tools.

Scratch defects on fiber end surfaces appear as straight or curved lines in an acquired image. Machine vision systems used for inspecting fiber ends detect these lines to locate defects. The lines often have very low contrast and are speckled with noise and texture artifacts and therefore do not always appear continuous to common edge detection techniques that use local metrics or small kernel sizes. Such contours that appear discontinuous in an image are particularly difficult for machine vision systems to identify. These straight or curved contours are the image features that are to be identified and located when inspecting fiber ends for scratches.

One common technique well known in the art of computer vision is called binarization where pixels in an image are classified into two groups. One group consists of pixels with a grey level value above a threshold and the other consists of pixels with a grey level below the same threshold. Once pixels are labeled as belonging to one of two groups, a technique called connectivity analysis can be performed. Connectivity analysis considers pixels that touch each other either at the sides, top or bottom or diagonally at the corners to be connected. Groups of connected pixels are commonly referred to as blobs. This technique is commonly referred to as blob analysis. Once blobs are extracted from an image, they can be analyzed by calculating various metrics such as area, first and second order moments, location, orientation, and perimeter, etc. The metrics could then be used to identify scratch-like features in an image.

The advantage of binary techniques such as blob are their simplicity and high speed. However, the major shortcoming of blob and other binary techniques is that a grey level threshold must be calculated. In actual applications, a separate processing step must be run to determine a binarization threshold. This is not always easy to do given that there may be many confusing features in the image. In many cases, especially in fiber end inspection, a single threshold may not exist due to low frequency intensity gradients across the image caused by the backlighting effects and the existence of the fiber core. Another shortcoming of binary techniques is that they only provide whole pixel accuracy. Also, scratches can have low contrast thus making it very difficult to find a usable threshold. When the texture and noise in the image has intensity values that vary from the mean of the background by as much as the contrast of the scratch itself, a binarization of the image will include many extraneous pixels in the same group as the scratches. This extraneous data must then be factored out when recognizing and localizing scratches.

Another common method of image analysis used in industry is referred to as template matching, in which a template is compared with like-sized subsets of the image over a range of positions. The position having the greatest match with the template is determined to be the position of the object in the image. A numeric representation of the degree of match can be generated and used for inspection purposes. One disadvantage of template matching methods is that they require a training step wherein a model image or template of objects to be located is generated and stored. For the inspection of fiber end surfaces, it is very difficult to generate models of defects such as scratches due to their variability. One would have to create models of potential scratches at many possible angles, lengths and curvatures. All these models would then have to be searched for in an image. This type of exhaustive technique is impractical since it would not run in a reasonable amount of time. There are many different types of template matching techniques used in computer vision such as matching with binary images, matching with grey scale images and normalized correlation which can handle differences in the mean pixel grey level values between model and image All of these variations on template matching suffer from the same shortcoming as mentioned above.

A method of geometric pattern matching was developed to overcome the limitations of image intensity based template matching methods by representing objects as geometric shapes independent of shading and independent of a discrete grid. The geometric pattern matching method can tolerate and measure wide variations in orientation and size of objects in an image, can be performed with high speed and high accuracy, and is able to tolerate severe shading variations. An exemplary geometric pattern matching tool called PatMax® is available from Cognex Corporation of Natick, Mass.

The geometric pattern matching technology used in PatMax® includes algorithms for feature detection, training, affine searching, pose refinement, and inspection. Feature detection produces a geometric description of object boundaries as an ordered list of boundary points that lie along contours separating dissimilar regions in the image. Unlike traditional edge detection, which simply marks certain pixels as edges, each boundary point specifies positions and orientation as real valued coordinates.

The geometric descriptions of objects produced by feature detection can be translated, rotated, scaled, stretched and otherwise transformed with no loss in fidelity. PatMax® uses a six degree of freedom affine transform which includes two degrees of freedom of translation and one each of rotation, scale, aspect ratio and shear. Each non-translation degree of freedom is specified as either a fixed value or a range of values to be searched. A fixed value for a degree of freedom allows a transformed version of the trained pattern to be found with no time penalty and no need to train extra patterns. For example, a single square pattern can be trained and used to find rectangular objects at a variety of known sizes and shapes by setting appropriate fixed values for the scale degrees of freedom.

In order to recognize an object in an image, analysis tools, such as PatMax®, must first be trained by acquiring and storing an image of a representative object or model. The model can be developed as an image of an actual object or can be synthetically constructed using CAD tools. During run time operation, the machine vision system acquires an image that may include the object of interest at any scale or orientation relative to the viewing device. The analysis tools will recognize the object in the image and compute the degree of rotation, scale and translation of the object in the image relative to the trained model. This computation is sometimes referred to as an alignment of the object. Alignment may also allow other degrees of freedom.

While PatMax® has some flexibility in performing a rotation and scale invariant search, it is not optimal for finding scratches on fiber ends. One reason is that scratches that appear as lines are very self similar along the line itself. Geometric pattern matching techniques will have difficulty localizing line models along lines in an image. Scratches may be of any length and finding lines of varying lengths with a single line model of a fixed length that can be scaled has problems. The tool will find a good match in the dimension perpendicular to the line, but along the line there can be many potential matches, all with an equal score. The many good matches can make the tool take a long time to execute and when the line model is allowed to change scale, the match calculation can become numerically unstable. PatMax® is also susceptible to the problems with lower level edge detectors as described next. PatMax® also requires moderately sharp edge features with reasonable contrast.

Scratches can be particularly difficult to detect because they usually have low contrast with respect to a fiber end surface. Various lighting methods can increase the contrast of scratches and cracks during image acquisition so that they can be more easily detected. For example, viewing a surface directly while applying side lighting, viewing a surface at an angle with lighting from the opposite angle, or transmitting light through the fiber core can make scratches and cracks more visible. These types of lighting and viewing angle changes can enhance the quality of the scratch contrast, but still will not be enough to make simple vision techniques work.

Another method of detecting scratches is to project the image of the fiber end surface to form a one dimensional projection image. This type of projection technique is well known in the art and involves summing the pixels along rows of an image such that the resulting image is a one dimensional image the has as many elements as rows in the source image and each element contains the sum of all the pixels in a row. Lines that are lighter than the background and that are horizontal, will appear as peaks in the 1D projection image. The location of the line is then determined from the row in which the peak occurred. This is generalizable to all angles where the image is rotated into position such that the candidate angle aligns to the horizontal rows. The shortcomings of this type of projection technique is that the length of lines can not be determined and only straight lines can be found. Projections are also very susceptible to confusion by bright spots. A bright spot appears on a projection exactly like a line with lower contrast.

Many machine vision algorithms require extracting what are called primitive or low level features and then building more complex objects or features from those simple ones. The most basic low level feature is a single pixel that has a grey value. A more complex feature would be an edge feature that results from applying a Sobel or Roberts operator that is well known in the art. These are small kernel operators (3×3 and 2×2) that return the direction and magnitude of the intensity gradient in the image at the location of the center of where the operator is applied. These operators are known in the art as edge detectors. While the previous techniques discussed (blob and template matching) analyzed the pixels of an image directly, the following techniques that have been used for scratch detection rely on processing the results of edge detectors that are called edge features.

Commonly used edge detectors have several shortcomings when used to detect scratches on fiber end surfaces. Scratches can be irregular at a small scale (1 or 2 pixels) but still appear uniform and straight at a larger scale. Scratches can also be faint and have low contrast. Since the support of the edge operator is no larger than 3×3, only sharp higher contrast edge features will be detected. Also, the small scale irregularities of the scratches will generate many false edges and miss many valid edges such that the subsequent processing steps, such as chaining, have too many features to consider, thus making such processing run slowly and produce erroneous results.

Often the problem of detecting and tracing scratches becomes a problem of grouping features such as edge features to form higher level contours. One well known method of grouping low level features into contours or lines that can be called scratches is to perform a Hough transform on the image space.

The Hough transform aids in the detection of lines or arcs of a particular shape. Each arc or line has some free parameters that, when specified precisely, define the arc or line. The free parameters constitute the transform domain or the parameter space of the Hough transform. Pixels or other features in an image are mapped into the Hough parameter space which is quantized into discrete bins called accumulator cells (a multidimensional array). Peaks in the accumulator array indicate that a line or an arc may exist at corresponding points in an image. See Robert M. Haralick and Linda G. Shapiro, *Computer and Robot Vision, Volume II* p. 184 (1993).

When applied to identify straight lines, an implementation of the Hough transform, called "line Hough", is used; typically, edge features of an image are used as the immediate input to line Hough. The line Hough is limited to identifying straight lines and, by design, detects lines that are very sparse. For example, two short segments on opposite sides of an image that happen to be co-linear will be reported as a line even if they do not correspond to the same continuous line segment. The line Hough has additional limitations including the generation of large numbers of candidates which must each be separately verified.

A more general Hough transform is used to find curves of specific shapes and sizes. Arbitrary curves or contours, such as some fiber end scratches, however, can not be found by any implementation of the Hough transform. Furthermore, the quantization of Hough space into accumulator cells can introduce significant error in the reported location of candidate lines or curves. Hough transforms also typically rely on lower level edge detection such as Sobel or Robert transforms and therefore suffer all of the limitations of those lower level operations.

Unlike Hough transform methods, chaining methods operate locally and do not connect unrelated pixels that may happen to fall on a predefined contour. However the local scope of chaining methods can prevent them from bridging small gaps to connect edge segments that do belong to the same contour. Such small gaps occur quite frequently in images and are especially problematic in low contrast defects such as scratches in optical fiber end surfaces.

U.S. Pat. No. 5,995,212 to Dar et al. (hereinafter referred to as "the Dar patent"), which is hereby incorporated by reference in its entirety, describes a method of inspecting an optical fiber for scratches using a windowing technique which implements Hough transform. The method according to the Dar patent disadvantageously requires extensive pre-processing to isolate regions of suspected scratches in which to apply the Hough transform. More significantly, the method according to the Dar patent suffers the same disadvantages of the general Hough transform in that it connects widely separated pixels that may not be part of a common contour.

Another approach to identifying contours in an image is chaining of edge features. U.S. Pat. No. 5,179,419 to Palmquist et al. (hereinafter referred to as "the Palmquist patent"), which is hereby incorporated by reference in its entirety, describes a method for detecting, classifying and quantifying defects including scratches. The method taught by the Palmquist patent breaks edge features in an image into segments to distinguish overlapping defects. Connected segments are decomposed and labeled to group pixels based on connectedness. Segments are connected to follow curves and break at sharp corners. Small segments caused by noise are discarded. The method of chaining edge segments taught by the Palmquist patent uses well known filters such Sobel filters. The chaining steps performed by Palmquist are much like base chaining functions performed by several image analysis tools, including PatMax®.

The method disclosed by the Palmquist patent disadvantageously requires the acquisition of an optimal focus image and auxiliary images behind and in front of the optimal focal positions. Since the method in the Palmquist patent uses simple Sobel edge detection, it suffers from all the shortcomings associated with this type of feature extraction technique as described previously.

U.S. Pat. No. 6,167,150 to Michael et al. (hereinafter referred to as "the Michael patent"), which is hereby incorporated by reference in its entirety, discloses a method of detecting edges in an image that represent scratches in disk drive heads. The method disclosed in the Michael patent detects edges in the image and determines if edges are connected using the magnitude and orientation of the edges. After eliminating edges based on magnitude, the orientation of neighboring edges are compared and are determined to form connected edges when the angle of the neighboring edges are within a pre-determined range of each other.

The method disclosed in the Michael patent works well to detect very thin scratches in the order of one pixel wide because it is designed to locate edges. Wider scratches, in the order of five to ten pixels wide, however, are recognized as two separate entities because each edge of such wider scratches are separately detected. This redundant reporting of found features requires additional processing, for example, to associate two edges with a common scratch feature. In addition, fiber scratches that are irregular, low in contrast or formed by a series of dots that are not necessarily connected, do not form continuous connected edges and will not be detected by this method. In fact, a string of dots may not be detected by edge detectors at all.

SUMMARY OF THE INVENTION

The invention provides a method for detecting scratches and/or cracks in an image by using relatively large, overlapping, oriented filters wherein each of the filters are specially tuned to respond to the frequency characteristics of an oriented scratch or crack of a particular width. The responses of these filters can be grouped into scratch contours using any of several methods. In order to detect scratches and cracks, an illustrative embodiment of the invention first acquires an image of an optical fiber end surface and optionally pre-processes the image to remove noise Next a set of oriented filters, e.g., Gabor filters, are applied to the image at quantized angles and scales. Features whose orientations correspond to any of the filter orientations have a higher filter output response and are extracted from the image. The extracted oriented features can be grouped into candidate contours for example using Hough line transforms or edge chaining. Other features in the image are deemed unlikely to arise from cracks or scratches and can be discarded.

The invention overcomes limitations of the prior art by allowing identification of low contrast surface scratches on an optical fiber end surface. The invention provides the advantage of optimized accuracy and discrimination between features and background and can be adapted for finding curved scratches as well as straight scratches. The invention also allows identifying scratches that are irregular and appear as strings of disconnected dots. Scratch features are detected as lines at a higher level than simple edges which more closely represent complete scratches and which require less post processing than simple edges.

Scratch features that are extracted according to the invention are amenable to a variety of feature grouping operations, for example, chaining. Multi-scale implementations of the present invention may be used to find scratches of different widths.

Scratch detection embodiments of the invention can also be used with several different methods for grouping features such as Hough line transforms for chaining. The invention speeds up processing of edge features by subsequent grouping algorithms because it provides fewer features for the grouping algorithms to process.

Embodiments of the present invention are also useful outside of the fiberoptic industry for extracting low contrast boundaries from machine vision images in general circumstances. Characterizations of scratches and cracks and other low contrast boundaries that are identified according to the invention are generally more accurate and robust than characterizations determined according to methods of the prior art.

BRIEF DESCRIPTION OF DRAWINGS

The accompanying drawings, referred to herein and constituting a part hereof, illustrate the exemplary embodiments of the system and method for applying oriented filters according to the present invention and, together with the description, serve to explain the principals of the invention.

FIG. 2 is an illustration of an exemplary embodiment of a rectangular box filter that is described in conjunction with at least one exemplary embodiment of the present invention;

DETAILED DESCRIPTION

Figure 1:
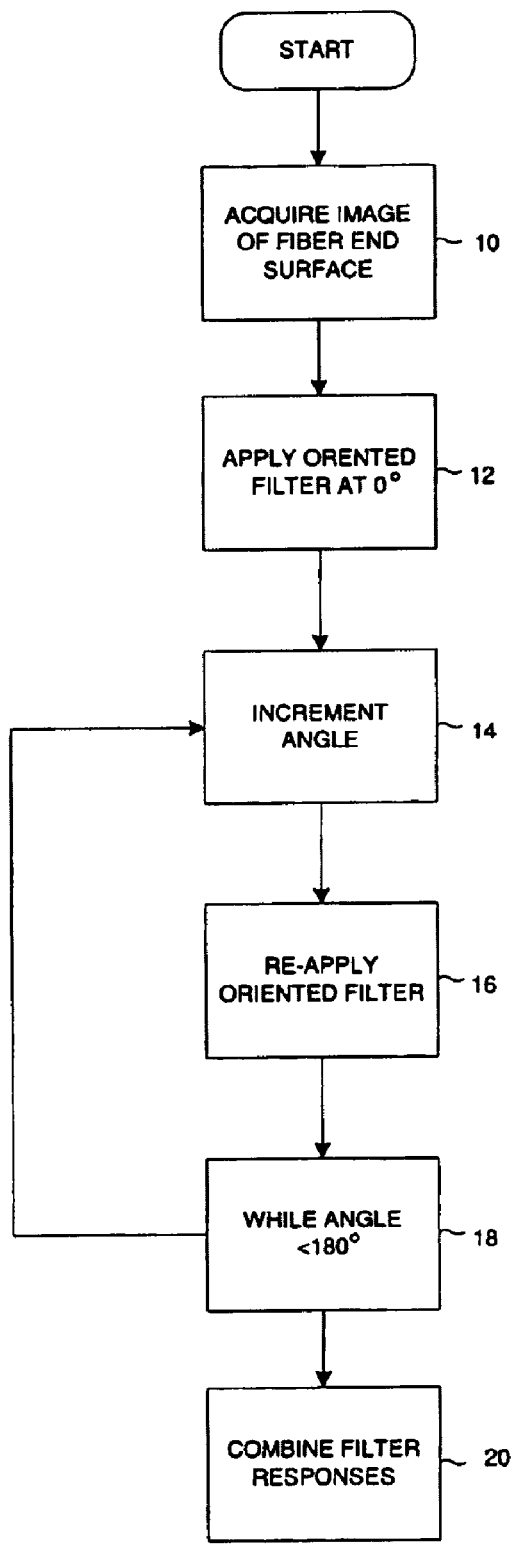
FIG. 1 is a flow chart illustrating the steps of applying oriented filters and combining the filtered data according to at least one embodiment of the present invention.

The method according to the present invention locates elements in an image that are likely to correspond to specific defects such as scratches in optical fiber end surfaces. The method provides enhanced detection of such scratches which typically appear as faint features having low contrast and locally disconnected elements in machine vision images. An illustrative embodiment of the method according to the present invention is shown in the flow chart of FIG. 1.

First, according to the illustrative embodiment, an image acquisition step 10 is performed. In a typical application, an image of a polished fiber end is acquired by a fiberscope camera that is designed to fixture and magnify optical fiber ends efficiently. The acquired image is typically transferred directly to a machine vision system.

Next, according to the illustrative embodiment of the invention, a filtering step 12 is performed wherein an optimized oriented filter is applied to the acquired image to identify similarly oriented features that are likely to be associated with fiber end surface scratches. The output of the filtering step 12 is a data set representing an angle and magnitude response for each pixel in an image. The angle and magnitude response for each pixel corresponds to a likelihood that a scratch aligned with the filter passes through the pixel location.

The filter angle is then incremented 14 through a predetermined angle and the newly oriented filter is reapplied 16 to the image. The incrementing step 14 and reapplication of newly oriented filters 16 are repeated 18 until the filters have swept through at least 180 degrees of orientation angles. For non-symmetrical oriented filters, applying them for all of 360 degrees may be required.

In an exemplary embodiment, a set of eighteen filters having angles of orientation from about 0 degrees to about 170 degrees is applied to the image. Each application of a different oriented filter generates a different data set representing the response for each pixel to that particular filter. The increment angle may be constant or may be variable to provide regular or irregular spacing of filters respectively. Irregular angular spacing may be desirable, for example, where it is known that cracks are concentrated at certain angles, so that filter angles are clustered around angles of interest.

The set of filters and/or increment angles can be defined to ensure that angularly adjacent filters overlap. Such overlap tends to even out the response of the filter bank to all angles so there is no preference to any specific angle.

The outputs from each application of filters are then combined 20 to form a combined filtered data set. The combined data comprises an angle image wherein the angle responses for each pixel are combined and a magnitude image wherein the magnitude responses for each pixel are combined. This data can alternately be represented as two magnitude images, one image that has the combined X component and one image that has the combined Y component. The combined angle and magnitude can also be computed for each pixel from this alternate representation with simple trigonometric calculations.

The unique characteristics of scratches in fiber end surfaces, i.e., that they are typically long straight lines having a particular special frequency, facilitates their detection using properly oriented elongated filters. In an illustrative embodiment of the present invention, the optimized oriented filters are long narrow filters that are tuned to the spatial features of the scratches.

Scratches typically appear as straight or moderately curved lines at low magnification. They are characterized by the fact that pixels that are considered to be part of the scratch appear as belonging to the scratch to the human eye because the mean gray value of the scratch pixels are slightly different than the mean value of the background. This difference in mean value makes them visible even though the mean gray value difference can be as small as 1 grey level. The pixels that are considered to be part of the scratch are not necessarily connected or neighboring. Therefore, it is possible for the scratch to have holes or gaps where background valued pixels occur in the middle of the scratch. A simple analogy is that some scratches appear as a series of dots that are ordered in a straight line. The scratch edges are typically not very sharply defined and scratches have the property that when viewed under increasing magnification or resolution, they tend to become less visible. Conversely, as magnification decreases, they will also become less visible. This characteristic of scratches indicates that they are optimally viewed and inspected at certain resolutions because they have characteristic spatial frequencies.

Figure 5:
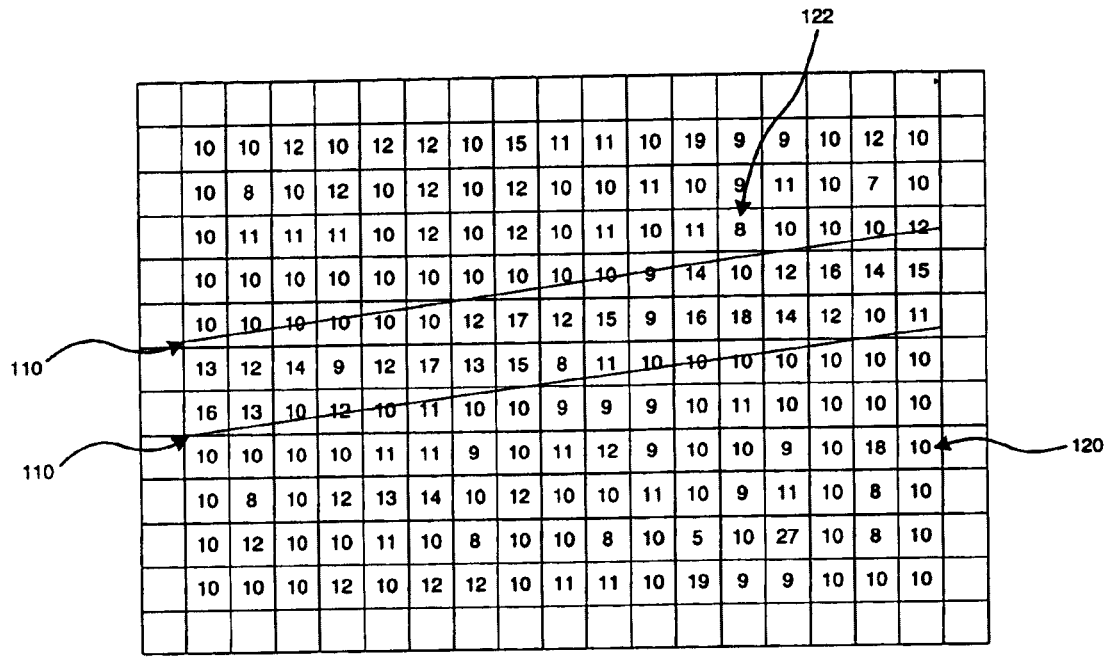
FIG. 5 is and illustration of the gray levels of an image where edges of a scratch are not well behaved and the scratch consists of unconnected bright pixels that form a larger scratch.
Figure 6:
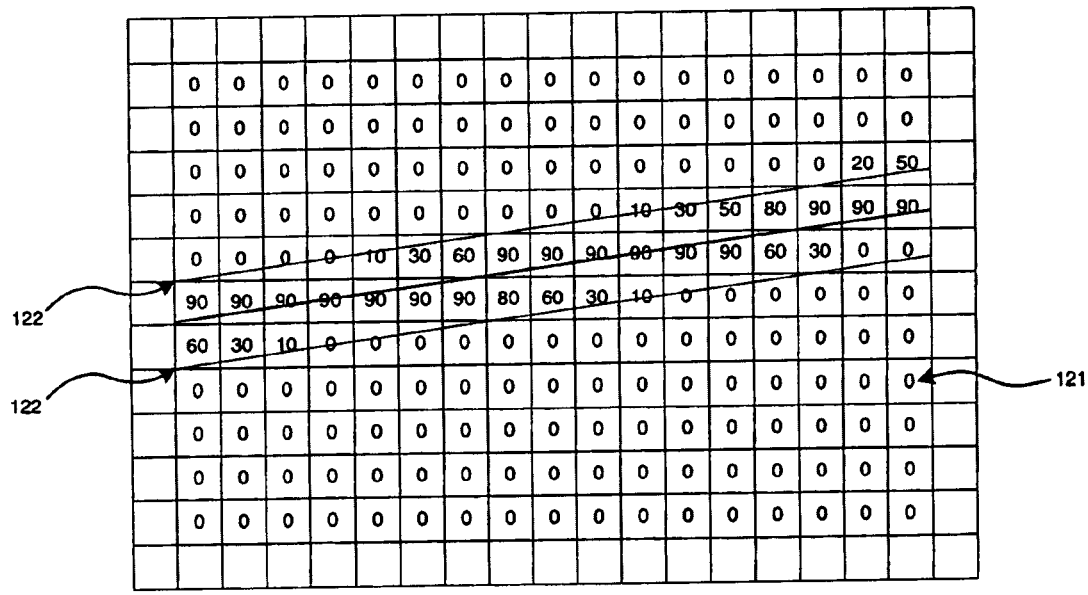
FIG. 6 is an illustration of the image in FIG. 5 after filtering with a Gabor filter at the orientation of the scratch.

The primary spatial characteristic is the width of the scratch, but the spacing of the scratch pixels is also important. In the direction along the line, the scratches have very low frequency characteristics. FIG. 5 illustrates a grey level image of an unprocessed scratch. Numeric values 120 in the image of FIG. 5 represent the grey-level of a pixel at a corresponding location in an image. It can be seen that the grey level values 122 do not readily show any scratch boundaries. The scratch envelope 110 indicates the approximate boundaries of a scratch in the image. FIG. 6 shows the magnitude response of a scratch that has been filtered with a Gabor filter. Numeric values 121 in the response data of FIG. 6 represent filtered values wherein a scratch can clearly be seen because values outside of a scratch envelope 122 are attenuated and values inside of a scratch envelope are amplified by operation of a Gabor filter.

The filters used according to various embodiments of the invention are 2D oriented filters. Such filters are characterized as having spatial bandpass filtering properties that are different in one dimension than they are in the orthogonal dimension. For example, oriented filters that respond well to long narrow features pass certain spatial frequency components in one dimension and low frequency components in the orthogonal dimension. This asymmetric bandpass property makes 2D oriented filters particularly effective to enhancing scratches in an image that are angularly aligned with the filters.

Figure 2:
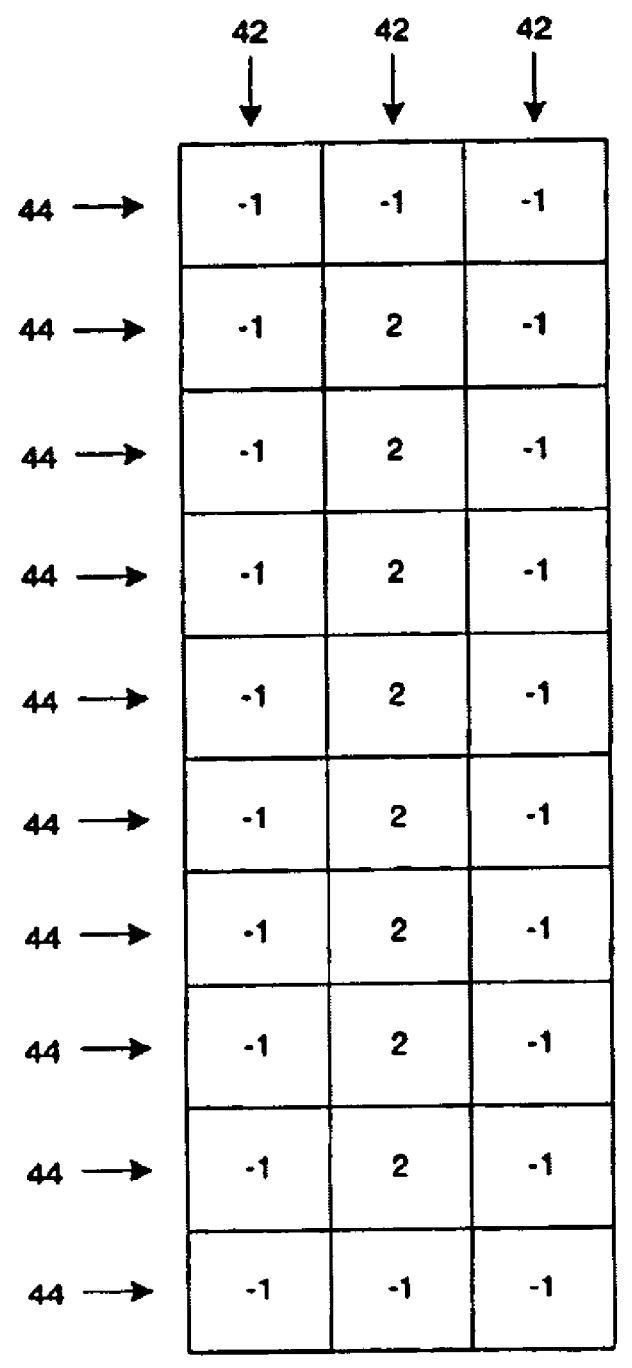

A simplified embodiment of the present invention uses an oriented box filter such as a 3 by 5 box filter or a 3 by 10 box filter. FIG. 2 illustrates an exemplary 3 by 10 box filter having 3 columns 42 and 10 rows 44. This simplified box filter is an approximation to a Gabor filter. Note that in the short dimension it has a bandpass profile consisting of a large center value with a negative value on either side. This is typical of most bandpass filters such as in the second derivative of a Gaussian filter which is well known in the art. In the long dimension, it is essentially a boxcar filter which is a well known smoothing or low-pass filter. These types of filters perform the basic function of an oriented filter, however do not provide optimal filtering in that artifacts such as ringing may be introduced. They can be used if the artifacts do not effect later processing as the speed of filtering with boxcar type approximations is typically faster.

A bank of Gabor filters can be applied wherein each filter has an different orientation so that one of the applied filters will output a strong response to a scratch to which it is similarly oriented. A filter kernel is typically applied to each pixel in an image by convolving a Gabor filter kernel with the image. When a strong response is detected, indicating that the pixel represents a potential scratch component, the magnitude of the response and the orientation of the filter are recorded in association with the pixel.

Gabor filters, as known in the art, are spatial bandpass filters that are complex-valued (having both real and imaginary components). The 2-d Gabor function is composed of sinusoidal wave of a particular orientation and frequency and orientation with a Gaussian envelope centered at a particular 2-d point.

A Gabor function with frequency ω and orientation θ, is given by $$G(x, y) = \exp(2\pi i\, \omega(x\cos(\theta) + y\sin(\theta)))\exp\left(-\frac{1}{2}\left(\frac{x^2}{\sigma_x^2} + \frac{y^2}{\sigma_y^2}\right)\right)$$

Here $(\sigma_x, \sigma_y)$ specify the standard deviations (spread) of the Gaussian in the spatial domain in the direction of x and y axes, respectively. The Fourier transform of this Gabor function has also a Gaussian envelope centered at ω and oriented at θ in the frequency domain. The spread of Gaussian in the frequency domain is inversely proportional to the spread of the Gaussian in the spatial domain.

Gabor filtering is the operation of convolving an input 2-d signal with a Gabor function. The Gabor filters are frequency and orientation selective as demonstrated by Fourier analysis.

Figure 3:
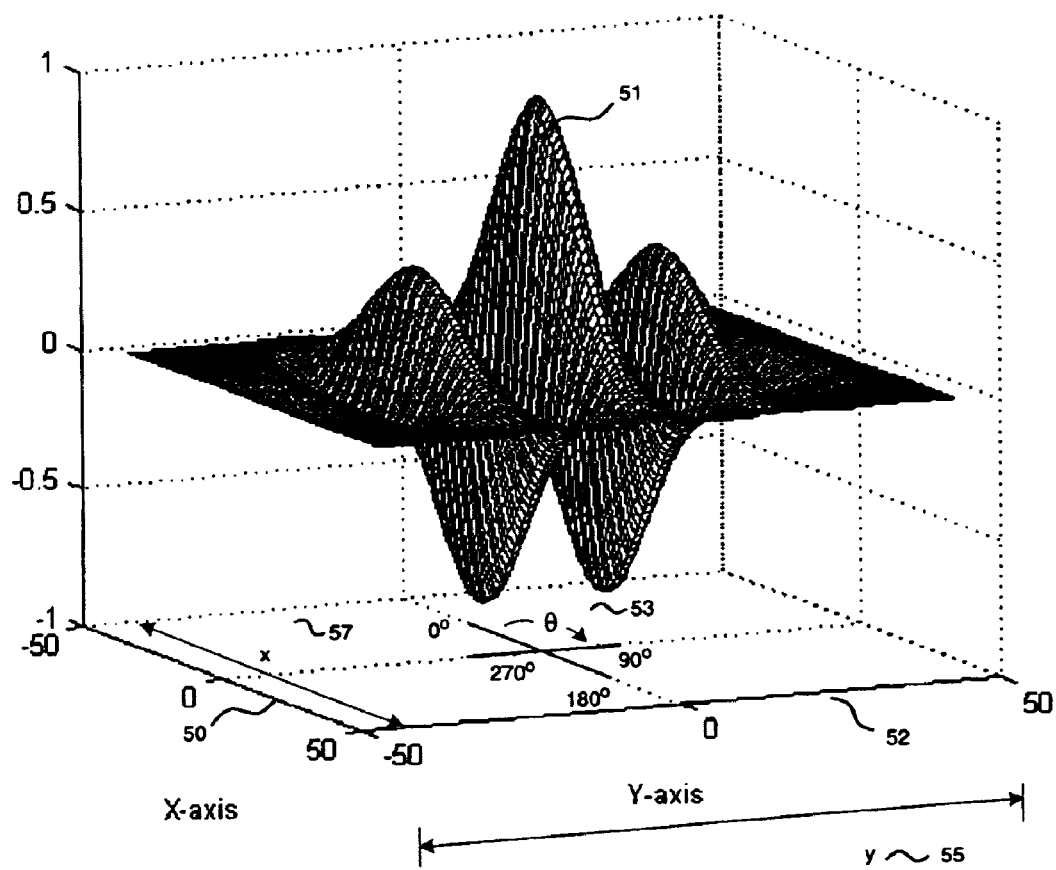
FIG. 3 is an illustration of the real part of a complex Gabor kernel as employed in at least one embodiment of the present invention.
Figure 4:
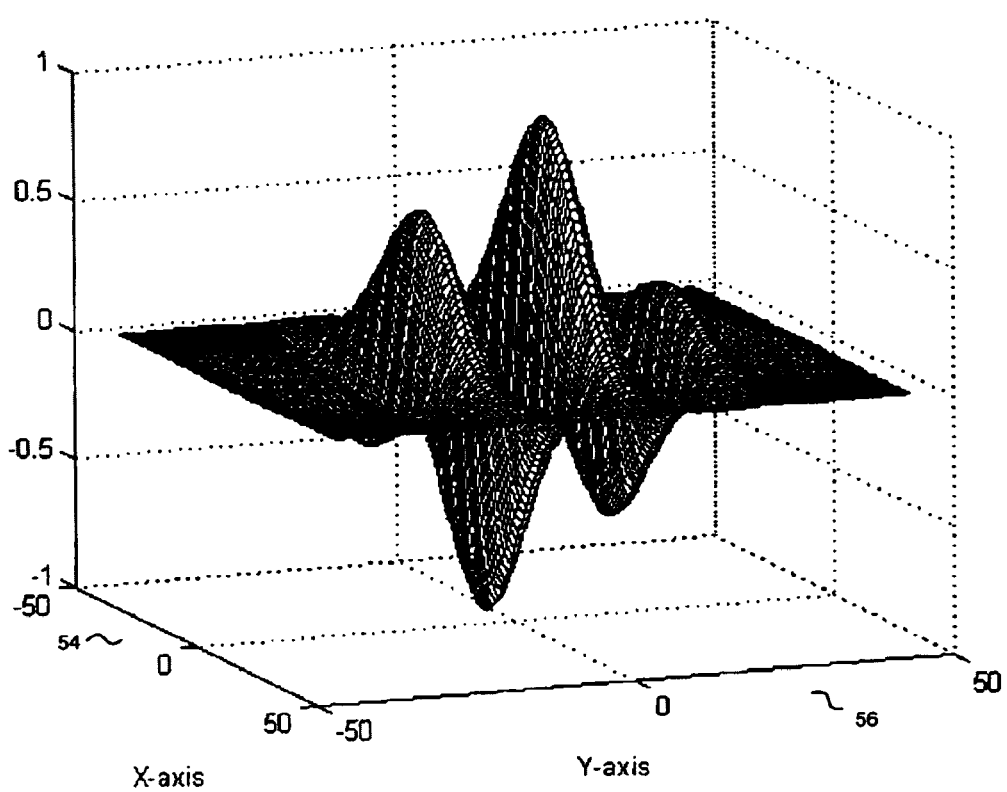
FIG. 4 is an illustration of the imaginary part of a complex Gabor kernel as employed in at least one embodiment of the present invention.

FIG. 3 and FIG. 4 illustrates the real and imaginary parts respectively of an exemplary Gabor filter kernel. The magnitude of the curve 51 over space indicates the extent to which image pixels are amplified or attenuated when the Gabor filter is applied to an area of an image. Referring to FIG. 3, the x axis 50 and y axis 52 can be envisioned as being parallel to the image plane. The orientation angle θ 53 corresponds to the angle of rotation of the Gabor kernel. Referring to FIG. 4, the x axis 54 and y axis 56 are shown with respect to the imaginary part of the Gabor kernel.

Persons skilled in the art should recognize that changing the size of the kernel in the y direction affects the angle sensitivity of the filter. The larger the kernel is in the y direction, the less angle sensitive it is. That is, it will have a higher response to lines that are not exactly at the nominal angle. If the kernel is made smaller in the y direction, it becomes much more narrowly sensitive to only the nominal angle and will reject lines that are off by even a few degrees.

Criteria for the resolution of angular distribution depends on the width of a the filters. For example more angularly localized filters would need to be incremented more finely and therefore more filter applications would be required, using more processing time. Contrarily, filters that are less localized to angle could be more widely dispersed, requiring fewer applications and less processing time. In an illustrative embodiment of the invention, a set of 18 Gabor filters are applied to the image at angular increments of 10 degrees, for example, from 0 degrees to 180 degrees. These filters preferably overlap with adjacently oriented filters so that no scratch components should fall between filters without being enhanced. In and illustrative embodiment, the filter response is symmetric so it is unnecessary to apply filters at angles of orientation greater than 180 degrees. The output from the set of 18 Gabor filters is 18 data sets representing the response of each image pixel to each filter. It is also possible to have non-symmetric bandpass filters such as the imaginary part of the Gabor filter. This filter will give different responses to scratches that are perfectly symmetrical and can be used for detecting the direction of edges.

Other parameters of the optimal Gabor filters that are used in the illustrative embodiment of the invention are determined based on characteristics of scratches being sought. As opposed to various known edge detection methods, the present invention is tuned to find scratches or lines having a width that typically includes a pair of edges. The filter parameters according to the invention are programmable to find scratches of any width, for example from one pixel to about ten pixels wide. The method according to the present invention is not so sensitive to miss scratches whose width is off by a small amount; therefore only an approximate knowledge of scratch width is needed to program the filters.

Persons skilled in the art should recognize that changing the size of the Gabor kernel in the X direction effects the sensitivity of the filter to the length of scratches. This is adjusted by the parameter sigma x according to the preceding formula. As this size is increased, short line segments will be merged together to form longer line segments. As described earlier, scratches can appear as a string of dots. Increasing this filter parameter will allow for larger gaps between dots where the dots will still be connected in single line.

The parameters for the Gabor filters include a) the bandpass frequency, ω, to which the filters are tuned; b) the orientation, θ 53; c) a horizontal filter support size x 57 which is related to the value of $\sigma_x$ according to the preceding formula for Gabor function above; and d) a vertical filter support size y 55 which is related to the value of $\sigma_y$ according to the formula for the Gabor function above. Changing the bandpass frequency ω of the filter adjusts the sensitivity of the filter to various widths of scratches.

Determination of the various parameters for optimal Gabor filters can be performed either empirically or theoretically by persons having ordinary skill in the art. See for example, John G. Daugman, *Uncertainty Relation for Resolution in Space, Spatial Frequency, and Orientation Optimized by Two Dimensional Visual Cortical Filters*, J. Opt. Soc. Am. A/Vol. 2, No. 7 (July 1985); and John G. Daugman, *Complete 2-D Gabor Transforms by Neural Networks for Image Analysis and Compression*, IEEE Transactions on Acoustics, Speech, and Signal Processing, Vol. 36, No. 7 (July 1988), which are both incorporated herein by reference in their entirety, describing two dimensional Gabor optimal filters.

Gabor filters are complex valued in that they have a real and imaginary component. The filters are applied by convolving both the real kernel and the imaginary kernel with an image. All input images are real valued only. The result of these convolutions is two images that comprise a real image and an imaginary image. These two image comprise a complex value at each pixel. An alternate representation for complex values that is well known in the art is using magnitude and phase, rather than the real and imaginary values. In an illustrative embodiment, the magnitude of the complex valued result is used for subsequent processing and is output as a single image as the filter response. As is commonly known in the art, the magnitude of the complex valued result is the square root of the sum of the square of the imaginary part of the complex value and the square of the real part of the complex value. That is, for image A the magnitude is:

$$|A| = \sqrt{Re^2(A) + Im^2(A)}$$

It is also commonly known in the art that the phase of the complex value is computed as the arctangent of the ratio—imaginary part of the complex value over the real part of the complex value. That is, for image A the phase θ(A) is:

$$\theta(A) = \tan^{-1}(Im(A)/Re(A))$$

The phase of the complex value is useful for determining the polarity of features. In the illustrative embodiment, the sign of the phase of the filtered image is used to determine if a scratch is light or dark.

It is possible to perform filtering on a computer in a variety of mathematically equivalent ways. Convolution can also be implemented by computing the Fourier transform of the corresponding filter kernel, computing the Fourier transform of the image, multiplying the two transforms in the frequency domain and inverse transforming the result back into the spatial domain. This is mathematically equivalent to filtering by convolution and can have certain speed advantages given the availability of a fast Fourier transform method. There are other methods that are equivalent or nearly equivalent to Gabor filtering such as decomposing the Gabor kernel into mathematically separate pieces such as a sine wave and a Gaussian kernel and convolving the parts with the image and combining the results. See for example, Unser, M., *Fast Gabor-Like Windowed Fourier and Continuous Wavelet Transforms*, IEEE Signal Processing Ltrs., Volume 1, No. 5, pp. 76–79 (1994), which is incorporated herein by reference in its entirety.

As part of speed optimizations for the illustrative embodiment, sub-sampling of the image and the frequency domain are used. Typical Fourier transform techniques restrict the size of the input image to powers of 2, such 4×4, 16×16, 256×256. It is well known in the art that images of these sizes can be processed more efficiently. Input images in this invention can be any size, although typical are standard format video images of size 640×480. In an illustrative embodiment of this invention, the image is sub-sampled to fit into a size of 256×256. The filtered frequency domain images can also be sampled in the frequency domain for speed optimization. This is done by windowing the filtered image in the frequency domain to be half the size before reverse transforming. For example, the 256×256 frequency domain image will be cropped to be 128×128, while keeping the same low frequency components (including DC) and eliminating the higher frequencies. It is observed that in fiber end images very little of the interesting scratch information resides in the higher frequencies. This reduction of data speeds-up processing by reducing the amount of image data to process.

After the bank of oriented filters is applied and a data set is stored for each one, a composite image is generated that combines all of the data sets. The data sets can be combined in any number of ways generally known in the art, such as by taking an average magnitude and angle at each pixel. In an illustrative embodiment of the invention, the data sets are combined by evaluating the response of each pixel to each filter and taking the maximum response of each pixel along with the angle of the filter to which that maximum response was realized. Each featured pixel in the processed image is thereby assigned a magnitude and an angle that indicates whether a feature under this pixel has a certain orientation and has a certain magnitude indicating the strength of the response. Typically, a single scratch will generate responses from multiple filters. In particular, when the angle of the scratch is in between two filters, the filters might respond equally. A technique for generating more even filter responses is to combine the results of multiple angle filters into one by interpolating the filter responses. For example, the responses to angularly adjacent filters can be interpolated to form an even filter response.

In an illustrative embodiment of the invention, the composite image is screened to identify and sort pixels having a strong response and similar angles. These pixels can be grouped into candidate contours. The candidate contours can then be passed to a higher order process such as a Hough or chaining process to form higher order groups and ultimately to form complete contours such as scratches. An exemplary chaining process can be performed according to the method described in U.S. Pat. No. 6,941,016 which is hereby incorporated herein by reference in its entirety.

An alternative embodiment of the invention applies additional filter banks that having different parameters. For example, additional filter sets may be programmed to find scratches of different widths. Multiple iterative applications of filter sets can be performed according to alternative embodiments of the invention to locate scratches having a range of widths.

Although the illustrative embodiment of the invention is described in terms of applying Gabor filters, persons skilled in the art should recognize that any 2D oriented filter set can be applied to an image to generate a plurality of response images according to the present invention.

Although the illustrative embodiment of the invention is described in terms of inspecting optical fiber end surfaces for scratches, persons skilled in the art should recognize that the present invention can be used to inspect a wide variety surfaces for a variety of defect types.

Although the illustrative embodiment of the invention describes the application of chaining to a combined image, persons skilled in the art should recognize that chaining can be applied to each filtered image, i.e. at each orientation before the set of filtered images are combined to form a combined image.

Although the invention has been shown and described with respect to exemplary embodiments thereof, persons skilled in the art should appreciate that various other changes, omissions and additions in the form and detail thereof may be made therein without departing from the spirit and scope of the invention.

What is claimed is:

1. A method of detecting defects in an object comprising the steps of:
   acquiring a digital image of said object;
   applying a set of oriented filters to said digital image to generate a corresponding set of filtered data, wherein said set of oriented filters comprise two dimensional oriented spatial bandpass filters having incremented angles of orientation between each of said filters; and
   combining said set of filtered data to form a combined data set representing defect features, wherein said combining step further comprises the steps of:
   evaluating a response of each pixel in said image to each filter,
   selecting a maximum response for each pixel and recording the angle of said filter to which said maximum response was related, and
   associating said maximum response and said angle with its respective pixel for each pixel in said image.

2. The method according to claim 1 wherein said filters are Gabor filters.

3. The method according to claim 2 wherein said step of applying said Gabor filters comprises applying only a real part of said Gabor filters.

4. The method according to claim 1 wherein said set of oriented filters comprises eighteen Gabor filters having angles of orientation from approximately 0 degrees to approximately 170 degrees at approximately 10 degree increments.

5. The method according to claim 1 wherein filter parameters are selected to identify scratches having predetermined width range.

6. The method according to claim 5 wherein said predetermined width range is about between three and ten pixels.

7. The method according to claim 5 wherein said parameters are further selected to ensure that angularly adjacent filters overlap.

8. The method according to claim 1 further comprising the step of chaining said filtered images to form a set of chained filtered images before said combining step and wherein said combining step combines said set of chained filtered images to form a combined image.

9. The method according to claim 1 wherein said incremented angles are clustered around predetermined angles of interest.

10. The method according to claim 1 wherein said object comprises an optical fiber end surface.

11. The method according to claim 1 wherein said applying step for each of said one or more oriented filters further comprises the steps of:
   computing a Fourier transform of a corresponding filter kernel to form a frequency domain kernel;
   computing the Fourier transform of said digital image to form a frequency domain image;
   multiplying said frequency domain kernel with said frequency domain image to form a frequency domain product; and
   inverse Fourier transforming said frequency domain product to form said filtered data.

12. The method according to claim 1 further comprising a step of sub-sampling said digital image to form a sub-sampled digital image prior to said step of applying a set of one or more oriented filters; and wherein said digital image to which said set of oriented filters is applied is said sub-sampled digital image.

13. The method according to claim 12 wherein said sub-sampled digital image is square having sides that are multiples of powers of two.

14. The method according to claim 1 wherein said step of combining said data set of filtered data comprises interpolating subsets of said set of filtered data wherein said subsets comprise filtered data responses from a plurality of oriented filters.

15. The method according to claim 14 wherein said plurality of oriented filters are angularly adjacent oriented filters.

16. An apparatus for detecting defects in an object comprising:
   an image acquisition device; and
   an image analysis system in communication with said image acquisition device wherein said image analysis system operates on an acquired image to detect defects by:
   applying a set of oriented filters to said acquired image to generate a corresponding set of filtered images, wherein said set of oriented filters comprise two dimensional orthogonal filters having incremented angles of orientation between each; and
   combining said set of filtered images to form a combined image by evaluating a response of each pixel in said image to each filter,
   selecting a maximum response for each pixel and recording the angle of said filter to which said maximum response was related, and
   associating said maximum response and said angle with its respective pixel for each pixel in said image.

17. The apparatus according to claim 16 wherein said filters are Gabor filters.

18. The apparatus according to claim 16 wherein said set of oriented filters comprises eighteen Gabor filters having angles of orientation from 0 degrees to 170 degrees at 10 degree increments.

19. The apparatus according to claim 16 wherein filter parameters are selected to identify scratches having a predetermined width range.

20. The apparatus according to claim 19 wherein said predetermined width range is about between three and ten pixels.

21. The apparatus according to claim 19 wherein said parameters are further selected to ensure that angularly adjacent filters overlap.

22. An apparatus for detecting defects in an object comprising:

means for acquiring an image; and means for analyzing said image in communication with said means for acquiring an image wherein said means for analyzing said image operates on an acquired image to detect defects by:

applying a set of oriented filters to said acquired image to generate a corresponding set of filtered images, wherein said set of oriented filters comprise two dimensional orthogonal filters having incremented angles of orientation between each; and combining said set of filtered images to form a combined image by evaluating a response of each pixel in said image to each filter, selecting a maximum response for each pixel and recording the angle of said filter to which said maximum response was related, and associating said maximum response and said angle with its respective pixel for each pixel in said image.

23. The apparatus according to claim 22 wherein said filters are Gabor filters.

24. The apparatus according to claim 22 wherein said set of oriented filters comprises eighteen Gabor filters having angles of orientation from 0 degrees to 170 degrees at 10 degree increments.

25. The apparatus according to claim 22 wherein filter parameters are selected to identify scratches having a predetermined width range.

26. The apparatus according to claim 25 wherein said predetermined width range is about between three and ten pixels.

27. The apparatus according to claim 25 wherein said parameters are further selected to ensure that angularly adjacent filters overlap.

* * * * *